H. A. BRYAN.
AIR BRAKE SYSTEM.
APPLICATION FILED APR. 4, 1919.
1,395,221.
Patented Oct. 25, 1921.
2 SHEETS—SHEET 1.
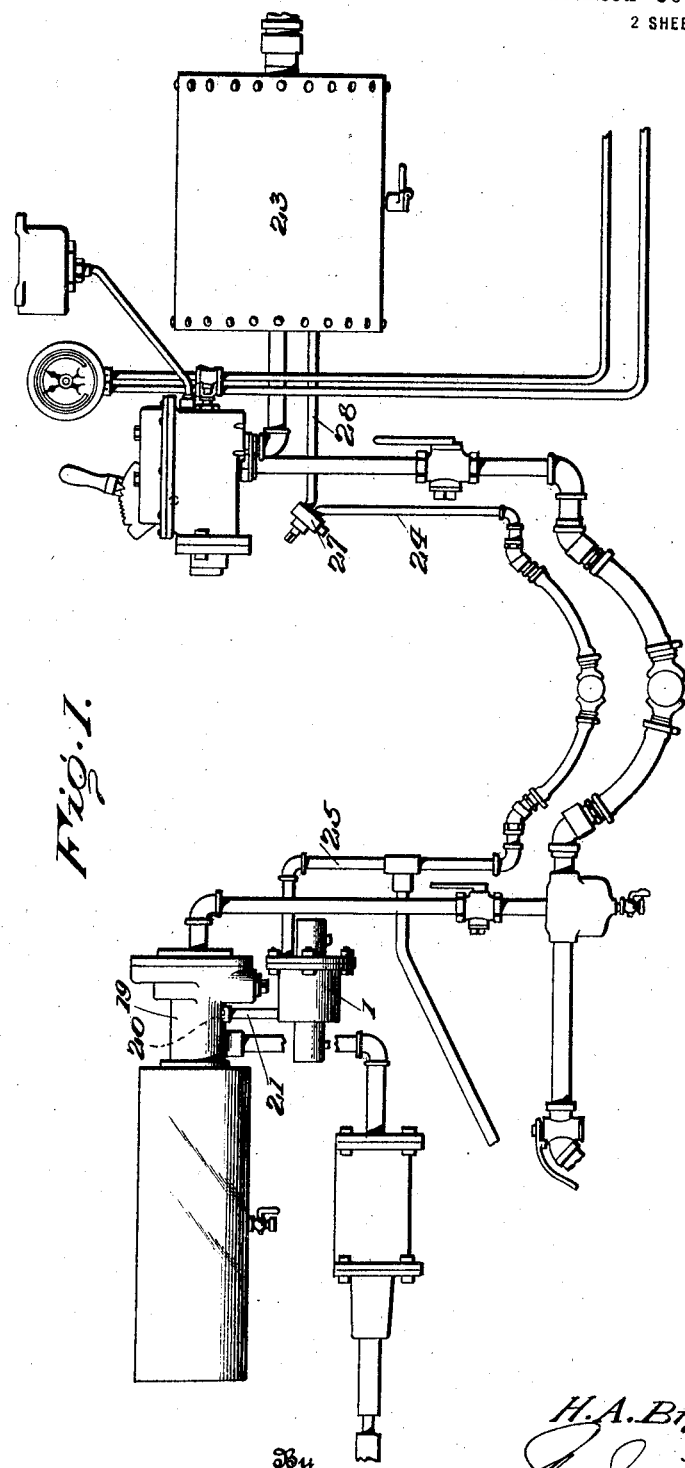
Inventor
H. A. Bryan.
By
Attorney

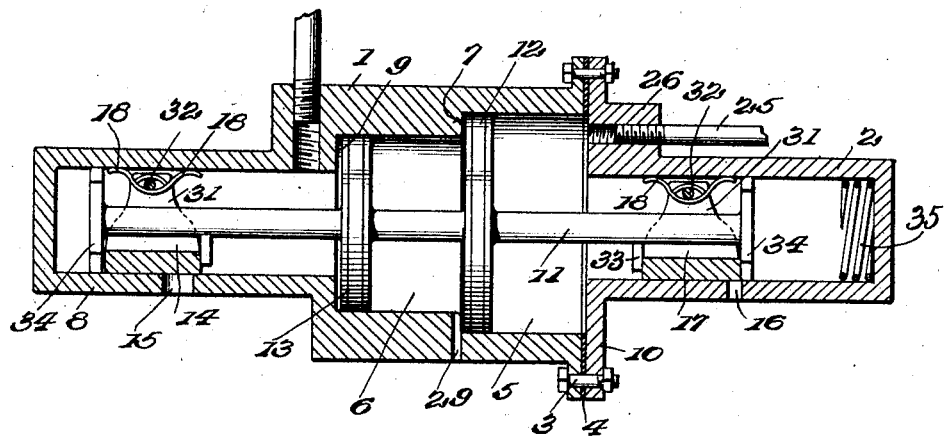
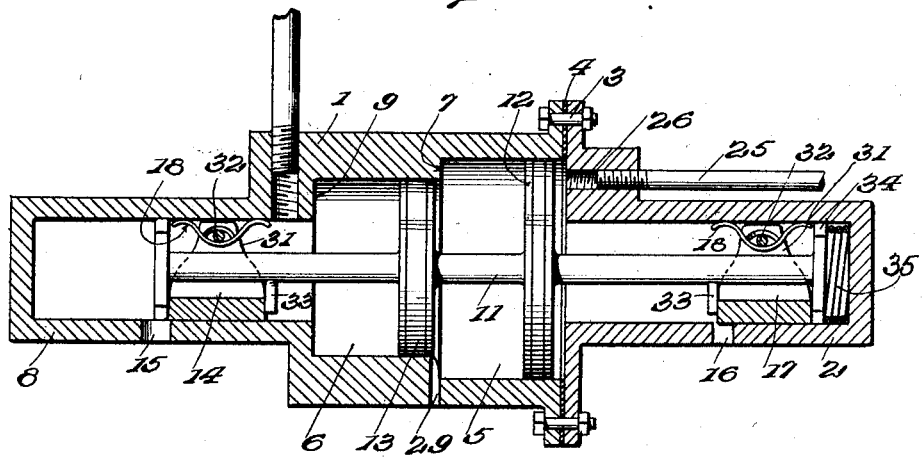

UNITED STATES PATENT OFFICE.

HENRY ALLIE BRYAN, OF MADILL, OKLAHOMA.

AIR-BRAKE SYSTEM.

1,395,221.                Specification of Letters Patent.        Patented Oct. 25, 1921.

Application filed April 4, 1919. Serial No. 287,613.

*To all whom it may concern:*

Be it known that I, HENRY ALLIE BRYAN, citizen of the United States, residing at Madill, in the county of Marshall and State of Oklahoma, have invented certain new and useful Improvements in Air-Brake Systems, of which the following is a specification.

This invention relates to an improvement in air-brake systems, and particularly to a holding valve in the use of which the brake-cylinders are prevented from exhausting to the atmosphere, notwithstanding the release position of the triple valve, until such holding valve or valves be directly released.

The main object of the present invention is to provide a simple means by which the brakes may be held under full application, notwithstanding the aeration of the engineer's valve, to cause the triple valves to remove to release positions, to thereby avoid the use of the complicated pressure retainers for this purpose.

The present holding valve is designed to be associated, one with each triple valve, and to have open communication from the exhaust pipe from such triple valve, the holding valves, having pistons of unequal diameter, with the larger under the influence of the main reservoir pressure, while the smaller is subjected to the brake cylinder pressure, when the improved valve is in operation. An exhaust port in the holding valve is normally closed against the relief of the brake cylinder pressure, until the main reservoir pressure against the larger piston of the holding valve has been relieved.

In the drawings, Figure 1 is a view illustrating diagrammatically an air braking system, the improved holding valves being shown in position.

Fig. 2, is an enlarged vertical sectional view of the improved holding valve, the parts being shown in holding positions.

Fig. 3, is a similar view with the parts in release positions.

The improved holding valve is here shown as comprising a casing, made up preferably for convenience in assembling in sections 1 and 2 secured together by bolts 3, with the junction sealed, as by gasket 4, against leakage.

The section 1, which constitutes the main section of the valve is longitudinally cored to produce what may be termed a series of chambers. The main pressure chamber 5, at what may be termed the forward end of the section 1 is of the maximum diameter, an intermediate chamber 6 being formed next the main pressure chamber 5 and of somewhat less diameter than said chamber 5, to present an abrupt shoulder 7 at the juncture of the chambers, a final or release pressure chamber 8 being formed beyond the intermediate chamber 6 and of less diameter than the latter, presenting an abrupt annular shoulder 9 at the junction of said chambers.

The section 2 of the casing is longitudinally cored to form a continuation of the main pressure chamber 5, this section 2 being of materially less diameter than the body of the section 1, and having a substantial annular flange 10 to provide for the connection of the sections, as hereinbefore described.

A piston rod 11, is operative in the casing, being of less length than the interior dimension of the casing. A main pressure piston 12 is secured to the rod 11 and operative in the main pressure chamber 5, a release pressure piston 13 being also secured to the rod and operative in the intermediate chamber 6. That portion of the rod 11 extending into the chamber 8 is provided with a valve 14, adapted when the pistons are at the limit of movement under the main reservoir pressure to close an exhaust port 15, the opposite movement of the pistons opening said port. A relief port 16 is formed in the section 2, that is in the main pressure chamber, which port is normally closed by a valve 17 on the rod 11 and open under free exhaust pressure.

The valves 14 and 17 are flat on their operating faces, and have upstanding flanges 31 to straddle the piston rod. Springs 18 are secured to pins 32 seated in the flanges of the respective valves, and bear against the walls of the chambers to maintain the valves in seating positions.

The valves are arranged between projections 33 and 34 on the piston rod, the projections 34 being in the form of non-circular members as shown to prevent turning of the piston rod and possible unseating of the valves.

The port 16 is just free of the edge of valve 17 when the parts are under free exhaust pressure, that is in full release position, while at this time the port 15 is so spaced with relation to the free edge of valve 14, that when the piston rod has recovered to cause valve 17 to cover port 16, port 15 will be just free of valve 14. In other words the port 15 is spaced from the edge of valve 14 a distance equal to the diameter of port 16, when the parts are in release position. This relative arrangement permits the use of means to prevent wastage of main reservoir pressure in operating the holding valve, and such means is here shown as a spring 35 secured in the pressure end of the holding valve, to be engaged by the valve-operating member 34 at that end of the piston rod and put under compression when the parts are in full release position. This compression is sufficient when exhaust pressure has been exhausted to move the piston rod a distance sufficient to move the valve 17 to cover port 16 without a sufficient movement to cover port 15 by valve 14. Admission of operating pressure to chamber 5 is thus guarded against leakage through port 16.

The holding valves are applied one to each triple valve 19, and the exhaust port 20 of such triple valve is in communication with the chamber 8 of the holding valve through a pipe 21. The holding valves are in direct communication with the main reservoir 23, through a pipe line 24, the pipe line leading directly to each holding valve through a connection 25, leading into the main pressure chamber 5 of such valve and preferably through the flange 10, which may be enlarged, as at 26 to receive the connection. The main reservoir pressure is thus directed squarely against the piston 12.

A valve 27 is provided in the pipe line through which the engineer may govern the admission of reservoir pressure to the pipe line 24 through a branch 28 and the control of the holding valves. After the usual application of the brakes, the main reservoir pressure following operation of valve 27, acting on the piston 12 will move the same to a position to cause the valve 14 to close the exhaust port 15 of the holding valve. In the movement of the triple valve to release position, the brake cylinder pressure passing through the triple valve exhaust, is led to the exhaust chamber 8 of the holding valve, and trapped against further exhaust, as the port 15 is closed. The brakes thus remain set notwithstanding the release position of the triple valve until the engineer bleeds the pipe line 24, to reduce the pressure in chamber 5, thereby moving the pistons under the influence of the brake cylinder pressure. Movement in this direction will uncover relief port 15. In full release position the port 16 is uncovered and operating pressure given an atmosphere-exhaust passage, the spring closing this port on balancing of pressure.

A bleed port 29 may be formed in the holding valve casing, in communication with the chamber 6, to prevent formation of a vacuum, and permit escape of air pressure which may leak by the pistons.

What is claimed as new is:—

1. A holding valve having a main chamber directly open to main reservoir pressure, an exhaust chamber open to the exhaust from the brake cylinder, a piston rod in said chambers, a piston on said rod to be operated by the pressure in the main chamber, a second piston on said rod to be operated by the pressure in the exhaust chamber, a valve carried by said rod to close an atmospheric exhaust port from the exhaust chamber, when the rod is at the limit of movement under the influence of the first mentioned piston, and to open said atmospheric exhaust port when the rod has been moved under the influence of the second piston.

2. A holding valve having a main chamber directly open to main reservoir pressure, an exhaust chamber open to the exhaust from the brake cylinder, a piston rod in said chambers, a piston on said rod to be operated by the pressure in the main chamber, a second piston on said rod to be operated by the pressure in the exhaust chamber, a valve carried by said rod to close an atmospheric exhaust port from the exhaust chamber, when the rod is at the limit of movement under the influence of the first mentioned piston, and to open said atmospheric exhaust port when the rod has been moved under the influence of the second piston, and a piston rod controlled relief port for the main chamber.

3. A holding valve having a main chamber directly open to main reservoir pressure, an exhaust chamber open to the exhaust from the brake cylinder, a piston rod in said chambers, a piston on said rod to be operated by the pressure in the main chamber, a second piston on said rod to be operated by the pressure in the exhaust chamber, a valve carried by said rod to close an atmospheric exhaust port from the exhaust chamber, when the rod is at the limit of movement under the influence of the first mentioned piston, and to open said atmospheric exhaust port when the rod has been moved under the influence of the second piston, the main chamber being formed with a relief port, and a valve carried by the rod to close the relief port at the limit of movement of the first mentioned piston, and to open said relief port in the initial movement of the second piston.

In testimony whereof I affix my signature.

HENRY ALLIE BRYAN.